3,343,988
SALTWATER BATTERY
Lloyd Lowndes Friend, Jr., Saratoga Springs, N.Y., assignor to Espey Mfg. & Electronics Corp., Saratoga Springs, N.Y., a corporation of New York
No Drawing. Filed July 8, 1964, Ser. No. 381,222
1 Claim. (Cl. 136—83)

The present invention relates to saltwater activated batteries and more particularly to batteries used in underwater operations.

Saltwater activated batteries are an inefficient and expensive power source and have little use in conventional power applications. This type of battery was extensively used in World War II in a deception system for pursued submarines. The pursued craft would eject a plurality of loud clanking pieces of gear. The pursuit ships would then be confused by the underwater noise made in various underwater locations thereby enabling the hunted craft to escape. To operate the noise producing gear, water activated batteries were used. Initially, this type of battery lasted only a few minutes. After extensive research, the life and efficiency of the battery was enhanced. In the period 1945–1952, applications for these batteries became more numerous and they are now produced on a commercial basis for a diversified list of military and civilian uses. Presently these batteries are used in airborne electronic equipment, signal lights, emergency flares, lights for floating buoys, lights for movie work, D-C motors, radiosonde units for weather observation work, emergency radio equipment, air-sea rescue equipment, ignition systems, emergency lights for hospitals, and direction finding equipment. The majority of today's applications require that batteries of this general type possess a service life of not more than two to three hours. However, there presently exists a demand for batteries possessing a service life of up to 60–72 hours continuous use and this type of D-C current source has been considered for certain deep sea applications with a service life requirement of 90 days. Batteries for these applications are essentially a one-time use device since they cannot usually be recovered from the bottom of the sea.

This type of battery is discussed in Kirk-Othmer et al., "Encyclopedia of Chemical Technology," vol. 3 (2nd. ed., 1964), pages 132 to 134 (Interscience Publishers), and an improved saltwater battery forms the subject of a co-pending application, Ser. No. 170,917, filed Feb. 5, 1962, now United States Patent No. 3,148,090, owned by the common assignee of this application. In accordance with the aforementioned article in the Kirk-Othmer et al., encyclopedia, two general ssytems are used: the magnesium-silver chloride system and the magnesium-cuprous chloride system. The cuprous chloride plates are spongy and are compacted by powder metallurgy techniques using a small percentage of resin binder to promote adhesion and containing several percent of powdered carbon which serves to reduce the internal resistance of the plate when activated. Quite commonly these plates are sprayed on one side (employing metal spray techniques) with a substantial layer of copper which serves two purposes, to act as a support for the pressed powder plaque, and, to act as a plate current collector. Any attempt to work the cuprous chloride plates renders them extremely brittle and useless. The performance of these plates is generally poor. Much better results are obtained from the use of solid silver chloride plates. The cost of the silver chloride plates is substantially higher than the cuprous chloride plates. Since the magnesium-silver chloride system has an operating voltage of about 1.5 volts, numerous cells are required for any sort of work to be performed. If used in underwater detection work, i.e., to detect the presence of fish, submarines, sunken vessels, etc., dozens of assemblies may be dropped over a wide area. The cost of this throwaway equipment is accordingly high.

Although attempts may have been made therefore to provide a saltwater activated battery capable of the high performance of the silver chloride cells but costing only as much as the batteries with cuprous chloride cells, none, as far as I am aware, were entirely successful when carried out into practice. In order to evaluate a good cathode plate material, and overall saltwater activated system, the following desirable prerequisites should be attained:

First, battery system should be capable of delivering what is accepted in the art as a suitable voltage at the specified discharge rate. And more important, the discharge voltage curve observed during the specified life of the battery should be essentially flat, i.e., should exhibit a narrow range of fluctuation on either side of the nominal voltage. A typical specification for a nominal 60-hour sonobuoy battery of the magnesium-silver chloride type will call for a voltage of $15.0 \pm 0.5$ volts when discharged continuously for its full life into a resistive load of 60 ohms (nominal discharge current of 0.250 ampere) under variations in saltwater temperature from $0°$ C. to $+30°$ C. and under variations in the saline content of the water from 1.5 to 3.0 percent. For a nominal 60-hour battery of the magnesium-cuprous chloride type, a typical specification will call for a voltage of $14.6 \pm 1.0$ volts when discharged continuously into a resistive load of 66 ohms (nominal discharge current of 0.212 ampere) under variations in saltwater temperature from $0°$ C. to $+30°$ C. and under variations in the saline content of the water from 1.5 to 3.6 percent.

A second feature to be desired from any salt water activated system is low "come-up" time. Come-up time can be practically defined as the time required for the battery to attain a certain specified voltage after immersion in a 1.5 percent saline solution at a temperature of $0°$ C. A typical magnesium-silver chloride battery specification will call for the output voltage to reach a minimum maintained level of 14.5 volts in 120 seconds after activation under the load conditions described above. A typical magnesium-cuprous chloride battery specification will call for the output voltage to reach a level of 11.0 volts in 60 seconds and a minimum maintained level of 13.6 volts in 180 seconds under the load conditions described above.

A third desirable feature to be desired in a saltwater activated system is a high watt-hour capacity to volume ratio. Since a significant portion of overall battery volume is occupied by the cathode plates, it is desirable that the volume occupied by an equivalent weight of active cathode plate material be as low as possible. The equivalent weight of silver chloride is 143.34 and its density in the solid state is 5.56 gm./cc. Therefore, an equivalent weight in grams of the solid material occupies approximately 25.8 cubic centimeters. The equivalent weight of cuprous chloride is 99.0 and its density in the solid state is 3.53 gm./ cc. Therefore, an equivalent weight in grams of the solid material occupies approximately 28.0 cubic centimeters. Pressed cuprous chloride plates, made by powder metallurgy techniques, occupy an even greater volume per equivalent weight of active material.

A fourth highly desirable characteristic for such battery systems is that the internal resistance of the system shall be as low as possible. High internal resistance contributes to poor cell efficiency in that much of the potential energy of the system is wasted in the production of heat. It is therefore highly desirable that the cathode plates at all times after initial activation shall possess a negligible ohmic resistance to the flow of current from any portion of the plate undergoing electrolytic action to the cell current collecting member. With silver chloride plates it is the accepted practice, after thorough cleaning of the surface, to reduce the chloride on the surface with a photographic reducing agent such as "Elon" developer forming a thin skin of coherent metallic silver over the entire exposed area. This skin is semi-permeable in nature and permits penetration of electrolyte to the unreacted silver chloride material. This metallic skin provides a low ohmic resistance path to the current collection member during the early stages of activation (during the voltage come-up period). Once activation has been initiated, good ohmic conductivity is assured since the cathode reaction consists in the reduction of silver chloride to metallic silver with excellent conductive properties. The use of wet processes for the production of a semi-permeable metallic skin of copper over the surface of copper chloride plates has not been commonly employed. Two methods are practically employed to increase the conductivity of copper chloride plates made by the compaction process. They consist in the one case of the addition of finely powdered carbon to the powder mix before molding and pressing and then by spraying molten metallic copper over one side of the pressed plaque subsequent to the pressing operation. The powdered carbon increases the internal conductivity of the plaque while the copper layer serves both as a structural support and as a broad area current collector for the plaque. Both of these strategems serve to increase the ohmic conductivity of the pressed powder plate but still do not create the ohmic conductivity characteristic of the silver chloride plate.

A fifth desirable prerequisite for such a system is that it shall possess an adequate shelf life under conditions of high humidity. A typical specification states that the battery system must be capable of operating with specified performance after exposure for 90 days in the ready-for-use condition (out of the container) at a temperature of 50° C., relative humidity of 90 percent and atmospheric pressure of 15 p.s.i. Battery systems employing silver chloride cathode plates which have been coated over all exposed surfaces with a semi-permeable metallic silver membrane possess excellent shelf life under such conditions, since silver is a relatively noble metal, and also, since any silver oxide coating, which might be formed as the result of atmospheric corrosion, possesses high electrical conductivity. Battery systems employing cuprous chloride plates are, however, subject to a degree of deterioration of the active surface of the plate. Cuprous chloride is hygroscopic in nature, and unlike silver chloride which is practically insoluble in water, is sparingly soluble, even in the cold. Net result is that under conditions of high humidity the cuprous chloride at the exposed surface of the plate will hydrate and dissolve to some extent, and, in contact with the air and salt spray, it will be somewhat oxidized to cupric salts such as the basic copper chloride ($Cu(OH)Cl$). In a relatively short time the entire active surface of the plate will become covered with a yellowish-green to azure-blue patina. This patina has some conductivity in the moist state, but it is distinctly inferior to that of metallic copper or silver.

A sixth desirable prerequisite for such a system is that the cathode plate material be sufficiently non-brittle in nature that it may be drilled, cut, trimmed, and otherwise machined or formed (hot or cold) so that it may be fabricated into a final shape suitable for automated assembly to a particular battery design. Silver chloride is a horny substance of rather an amorphous nature which may be freely machined in the cold state. Cuprous chloride, on the other hand, is an extremely crystalline and highly friable substance in the cold state (brittle in nature) which precludes certain machining and forming steps in the cold and moderately warm states. Solid homogeneous mixtures of the two chlorides become increasingly workable in the cold (normal atmospheric ambient temperatures) and in the warm (below the melting point) states as the silver chloride content of the mixture increases. It has been found that mixtures of silver chloride and cuprous chloride containing from 10–30 percent by weight of silver chloride are adequately machinable in the cold state and formable in the warm state.

A seventh desirable prerequisite for such a system is that the cathode plate retains its original dimensional shape and structural strength to a high degree as battery life progresses towards completion. With solid silver cathode plates there is no problem in this respect. As the cathode reaction proceeds, metallic silver is laid down in situ. The resulting porous silver retains its original shape and structural strength to a high degree. With copper chloride plates, however, the matter is different. As the cathode reaction proceeds, the copper content migrates away from the reactive surface with the result that the original cathode structure is eroded away. A cuprous chloride plate must therefore be provided with a metallic grid or back plate which acts both as a current collector and to support the active chloride material. This contributes to the non-reactive dead weight requirement for the cell system. With homogeneous solid silver chloride-copper chloride plates in the range of composition envisioned herein, a skeleton-like framework of silver is left behind as the reaction proceeds, which in turn acts as an internal current collector and grid support. In the wet plate, plate geometry is maintained to a large extent by the fact that as the reaction proceeds, the unreacted cuprous chloride picks up water of hydration and expands sufficiently to largely offset the plate shrinkage caused by copper migration.

An eighth desirable prerequisite for such a system is that the anode corrosion products be of such a nature that they fall freely away from the active anode surface. One of the difficulties encountered with the primary magnesium-silver chloride cell system, especially with cells designed for long life at low current densities, is that a very dense gel-like anode corrosion product is formed which is very adherent to the active magnesium surface and which can cause swelling of the cell case during the later stages of life and which can otherwise impede the desired electrolytic action to a marked extent. The aluminum containing magnesium alloys are somewhat less prone to the formation of this very dense adherent type of corrosion product and are, therefore, used as an anode material in this type of cell. With the magnesium-cuprous chloride cell the action is somewhat different. The cuprous ions freed at the cathode plate migrate to the anode. As cell life progresses the deposition of a light orange flocculent precipitate is noted which does not have any great tendency to adhere to the anode surface. Metallic copper is also continuously formed to some extent during the cell life and drops away from the anode surface. The active anode surface, therefore, remains comparatively clean running throughout the life of the cell. The two overall cell reactions simultaneously taking place to a greater or lesser extent can probably be represented by the equations

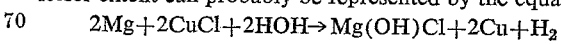

and

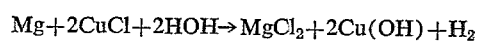

With the magnesium-mixed chloride (10 to 30 percent AgCl) cell, the anode action is also clean running and the anode products obtained are essentially as described for the magnesium-cuprous chloride cell.

It will be obvious from the above that the magnesium-silver chloride battery system represents a superior saltwater activated reserve battery system in most respects in comparison to that of the magnesium-cuprous chloride battery in the present state of the art.

It has now been discovered that a saltwater activated battery capable of good performance and which is also inexpensive can be provided.

Therefore, the principal object of the present invention is to provide an inexpensive saltwater activated battery.

The invention as well as other objects and advantages will be better understood from the following description.

Generally speaking, the present invention contemplates a saltwater activated battery wherein the anode plate is made of magnesium or one of its aluminum-containing alloys or a lithium-magnesium alloy, and the other plate is made of a homogeneous solid mixture cast from a melt of silver chloride and cuprous chloride. The cathode plaque is usually finished with a further surface treatment to aid in lowering initial come-up time. The anode plate may be made from primary magnesium, or a magnesium-aluminum alloy sold commercially under the A.S.T.M. designations of AZ–31B, AZ–61A (An explanation of this A.S.T.M. system of nomenclature may be found in the A.S.T.M. specifications for magnesium alloys or in the aforementioned Kirk-Othmer et al. encyclopedia, vol. 8, page 577 (1st edition, 1952). Actually the magnesium-aluminum alloy anode plate may even contain up to about 10 parts by weight of aluminum or other metals such as zinc. The lithium-magnesium alloy may contain from about 10 to about 35 parts by weight of lithium, and perhaps as much as about 1 to about 8 parts by weight of aluminum. The cathode plate will preferably consist of about 20 parts by weight of silver, the balance being cuprous chloride. The amount of silver chloride can be reduced to about 10 parts at small sacrifice to the ductility and machineability of the plate. Below about 10 parts, the plate becomes too brittle, its internal ohmic resistance during activated life becomes greater, and its ability to maintain rigidity of shape and coherence during the latter stages of active life are substantially impaired. If the amount of silver chloride is increased to over thirty parts, the cost of the plate increases with only small corresponding increase in performance.

Typical procedures for the manufacture of cathode plates having the above described metallic chloride composition can be described as follows. A mixture of battery grade cuprous chloride and silver chloride powders are dry-blended in a suitable low-humidity atmosphere and the blended mix charged into a fireclay crucible of suitable capacity. The crucible and contents are then heated until the chloride mix becomes molten and attains the desired fluidity for casting into molds. The melt may be cast into molds and cooled. The cooled ingots may then be reheated in a furnace, under low-humidity controlled atmosphere conditions, to a suitable temperature (under the melting point) to permit hot rolling of the ingots into strip or sheet. The cooled strip or sheet of desired thickness may then be cut or trimmed to the desired dimensions. The cast or wrought plates are next subjected to any further machining operations required for the particular battery cell design under consideration and then cleaned by vapor degreasing in tri- or per-chlorethylene. From here on storage of plates between process operations must be conducted in an air atmosphere at a temperature of about 70° F. and a relative humidity of 22 percent or less. The next processing operation consists in giving all external surfaces of the plate a semi-permeable, adherent metallic coating designed to lower the surface ohmic resistivity of the plate during the initial stages of activation. This may be accomplished in one of three ways as follows:

(1) Metallic coating may be accomplished by wet procedures. First a copper film may be deposited by alternate dipping of the chloride plate in 5 percent formaldehyde solution and then in a warm Fehling solution. The plate is first sand blasted over all surfaces to provide a roughened finish. Mirror plating is then accomplished by alternate immersions in a 5 percent solution of formaldehyde solution in water, followed by immersion in a typical bath of the composition

| | | |
|---|---|---|
| Anhydrous copper sulphate | gm | 2.0 |
| Silver nitrate | gm | 0.2 |
| Rochelle salt | gm | 4.0 |
| Potassium hydroxide | gm | 4.0 |
| Distilled water | cc | 100 |
| Temperature | F. | 70°–130° |

Alternate dipping is continued until adequate coverage is attained. The film produced by this operation is relatively thin and therefore not too conductive. To increase film thickness, the plate is next immersed, after rinsing in water, in an acid copper plating bath until a copper film of sufficient conductivity is attained. To increase the resistance of the deposited copper film to atmospheric corrosion, the plate, immediately after withdrawal from the acid copper bath, and after rinsing, is given a thin coating of silver by immersion, while still wet, in a conventional silver cyanide bath. Upon withdrawal, and after rinsing with water, the plate is quicky immersed in acetone and dried under heat lamps.

(2) Metallic copper coating may be accomplished by the spraying of a very thin and semi-permeable film of molten copper metal over the surfaces of the chloride plate which has first been sand blasted to provide a roughened finish. This copper spray coating may then be given a protective coating of silver by a short time immersion in a conventional silver cyanide bath, followed by rinsing and drying under heat lamps.

(3) Metallic silver coating, without previous copper coating, may be accomplished by the spraying of a very thin and semi-permeable film of molten silver metal over the surfaces of the chloride plate which has first been sand blasted to provide a roughened finish.

The metallic coated plates produced in the manner described are then ready for assembly into battery cells.

For the purpose of giving those skilled in the art a better understanding of the invention, the following illustrative example is given.

EXAMPLE

Several single cell batteries were tested. The individual cells were constructed by sandwiching a 3.00 in. wide by 4.65 in. long flat cathode plate between two 3.00 in. wide by 4.65 in. long magnesium, or magnesium alloy anode plates. The anode plates were separated from the cathode plate at a distance of 0.050 in. by insulating spacers. The assembly was then taped together to form a finished test cell. Both anode plates were connected in parallel so that they performed as a single anode. Output connecting wires were then attached to the cathode plate and to either one of the anode plates. The output load consisted in each instance of a resistor of 6.0 ohms shunted by a high impedance voltmeter. Each cathode effectively possessed an active area of 27.18 sq. in. The nominal output voltage of each cell was considered to be 1.5 volts. At the nominal voltage then (after activation), the current drawn by the load amounted to 0.250 ampere. Also, at the nominal voltage, the cathode current density amounted to 0.0092 amp./sq. in. Discharge current readings could be taken at intermittent intervals by switching an ammeter into series connection with the resistive load. The immersion cycle was carried out as follows. The battery cell, with leads attached, was inserted in a cold box and brought to an equilibrium temperature of −20° C. The battery cell was then removed from the box, its output leads immediately connected across the load and the battery immersed in a 1.5 percent saline water bath which was maintained at a temperature of 0° C. After 10 minutes, the battery was transferred to a 3.0 percent saline water bath which was maintained at a temperature of 30° C. Immediately from the time of activation, cell output voltage readings were recorded at predetermined time intervals during its discharge life.

TEST RESULTS

| Cathode Plate Used | Anode Plate Used | Come-up Time,[4] Sec. | Max. Voltage | Voltage at 60-hr. Life | Life in Hrs. to 14.5 v. |
|---|---|---|---|---|---|
| AgCl | AZ-31B Mg Alloy [1] | <15 | 1.53 | 1.48 | 73 |
| 10% AgCl Bal. CuCl | Primary Mg [2] | 160 | 1.50 | 1.45 | 60 |
| 20% AgCl Bal. CuCl | Primary Mg [2] | 90 | 1.52 | 1.48 | 76 |
| 20% AgCl Bal. CuCl | Li-Al-Mg Alloy [3] | 60 | 1.54 | 1.51 | 70 |

[1] Plates fabricated from cold-rolled strip 0.040" thick.
[2] Plates fabricated from cold-rolled strip 0.040" thick.
[3] Plates fabricated from rolled strip 0.060" thick.
[4] Time required for output voltage to reach 1.40 v. after activation in 1.5 percent saline water at a temperature of 0° C.

Although the present invention has been described in conjunction with preferred embodiments, it is to be understood that modifications and variations may be resorted to without departing from the scope of the invention, as those skilled in the art will readily understand. For example, in order to produce a battery having the desired output voltage it may be necessary to assemble a multitude of cells in close series connection. Such modifications are considered to be within the purview and scope of the invention and appended claim.

I claim:
A water-activated battery cell system, comprising an anode plate of material selected from the group consisting of primary magnesium, an aluminum alloy thereof containing up to about 10 parts by weight of aluminum and a lithium alloy thereof containing about 10 to about 35 parts by weight of lithium, and the cathode plate consists of a homogeneous solid mixture of silver chloride and cuprous chloride, the amount of silver chloride being at least ten parts by weight, said cathode covered over its entire outer surface with a metallic coating selected from the group consisting of copper and silver.

References Cited

UNITED STATES PATENTS 2,605,297  7/1952  Dean.
2,634,305  4/1953  Davis.
2,640,090  5/1953  Pucher et al.
2,836,644  5/1958  Morehouse et al.
3,044,164  7/1962  Bauer _____ 29—528

WINSTON A. DOUGLAS, *Primary Examiner.*

B. J. OHLENDORF, *Assistant Examiner.*